H. HOWARD.
FLUES FOR FLATTENING OVENS IN THE MANUFACTURE OF WINDOW GLASS.

No. 184,379. Patented Nov. 14, 1876.

Witnesses
James D. Kay
R. C. Crenshaw

Inventor
Hartley Howard
by Bakewell & Kerr
Attys

UNITED STATES PATENT OFFICE.

HARTLEY HOWARD, OF PITTSBURG, PENNSYLVANIA.

IMPROVEMENT IN FLUES FOR FLATTENING-OVENS IN THE MANUFACTURE OF WINDOW-GLASS.

Specification forming part of Letters Patent No. 184,379, dated November 14, 1876; application filed October 25, 1876.

*To all whom it may concern:*

Be it known that I, HARTLEY HOWARD, of Pittsburg, in the county of Allegheny and State of Pennsylvania, have invented a new and useful Improvement in Flues for Flattening-Ovens in the Manufacture of Window-Glass; and I do hereby declare the following to be a full, clear, and exact description thereof, reference being had to the accompanying drawing, forming part of this specification, in which—

Figure 1:
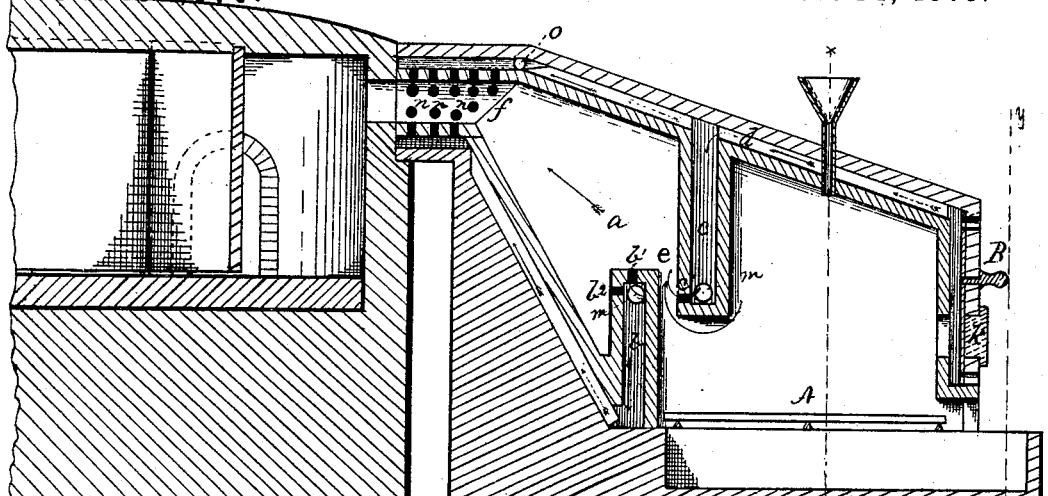
Figure 2:
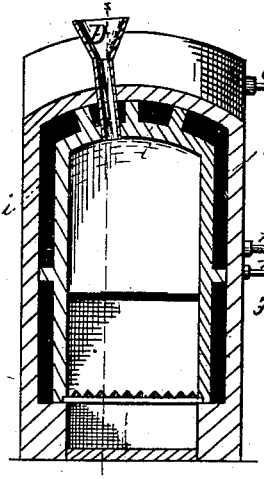
Figure 3:
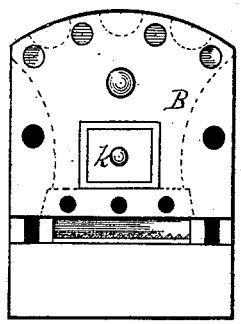
Figure 4:
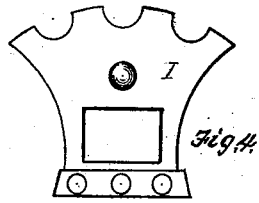

Figure 1 is a longitudinal vertical section of flue, &c., embodying my invention. Fig. 2 is a transverse vertical section on the line $x\,x$, Fig. 1. Fig. 3 is an end view from $y\,y$, showing the register-openings in the end wall for admission of air; and Fig. 4 is a detached view of the register.

Like letters refer to like parts wherever they occur.

My invention relates to the construction of flues for cylinder window-glass and like flattening-ovens; and has for its object such a construction of the flues that the combustion shall be so complete as to prevent the escape into the oven of sulphurous or carbonaceous fumes, dust, ashes, and other impurities which burn on and injure the glass.

I will now proceed to describe my invention, so that others skilled in the art to which it appertains may apply the same.

A indicates the fire-chamber, and $a$ the flue thereof, leading to the flattening-oven. Within and across the flue $a$ are arranged a series of hollow mantles or bridge-walls, $b\,c$, which communicate with the hollow space $d$ of the furnace-walls, and approach each other, so as to form a narrow throat, $e$, between the fire-chamber and flue proper. These bridge-walls $b\,c$ are perforated, as at $b^1\,b^2\,c'$, so that the air from the hollow wall of the furnace passes through the bridges, and is delivered to the products of combustion, carbonic oxide, &c., at the throat $e$. The hollow wall of the furnace may be made by leaving out one or more course of brick, enough brick, however, being retained to insure a firm and strong outer wall, and longitudinal division-walls to form flues, as shown at $i\,i$. The end wall B is perforated at points opposite the flues $i\,i$ for admission of air, and the perforations are guarded by a register, I, through which is also a small door, $k$, for starting and stirring the fire. The air admitted through $i\,i$ becomes heated before it reaches the hollow bridges $b\,c$; but in order to obtain a supply of cold air when desired, a series of openings, $m\,m$, which may be closed by plugs, are formed in the side walls opposite the hollow bridges. The hollow walls of the furnace are continued along the sides of flue $a$, and openings $n\,n$ are formed at the point $f$, where the flue connects with the oven, so that a further supply of heated air may be admitted to the products of combustion, if desired. Cold-air openings $o$ are likewise formed in the flue near its junction with the oven. D indicates a hopper, by means of which fuel is supplied to chamber A.

The operation of these devices is as follows: Fire having been started in chamber A, fuel will be added from time to time through hopper D, and the draft regulated so as to maintain slow combustion. The gases and products of combustion will escape from chamber A through throat $e$, where they will be oxidized by the air escaping from the hollow bridge-walls, and will burn freely in flue $a$ without the formation of cinder, or the production of sulphurous and other gases; but in order to guard against any possibility of unconsumed gases, &c., entering the flattening-oven, an additional supply of air is admitted at $n$, just where flue $a$ terminates. When the air admitted is required in a heated condition, the cold-air ports are closed, the register I is manipulated to unclose the ports in the end of the furnace, and the air will then pass back through spaces $i\,i$, and become heated on its way to the hollow bridge-walls and throat $f$ of flue $a$; but when cold air is required, then the plugs are withdrawn from ports $m\,m$ and $o$, thereby admitting the air directly to the bridge-walls and throat $f$.

The advantages arising from the use of a flue of the class specified, in connection with a flattening-oven, are the uniform heating of the oven, and entire freedom from cinder, dust, sulphurous and other gases, which injure the glass.

Having thus described my invention, what I claim, and desire to secure by Letters Patent, is—

1. The combination of one or more bridge-walls and air-inducts with the flue of a flattening-oven, substantially as and for the purpose specified.

2. The combination of one or more hollow perforated bridge-walls with the flue of a flattening-oven, substantially as and for the purpose specified.

3. In combination with the hollow-walled flue for flattening-ovens, perforated, as at $n\ n$, the hollow perforated bridge-walls, substantially as and for the purpose specified.

In testimony whereof I, the said HARTLEY HOWARD, have hereunto set my hand.

HARTLEY HOWARD.

Witnesses:
    JAMES I. KAY,
    F. W. RITTER, Jr.